Mar. 13, 1923.
M. F. BEECHER ET AL
1,448,684
LAMINATED SUPERREFRACTORY ARTICLE
Filed Apr. 8, 1921
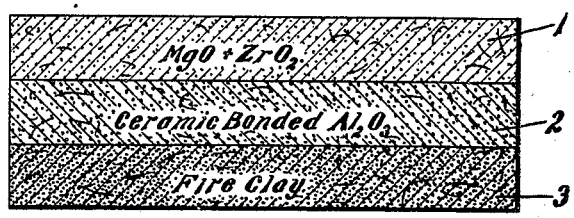
Witnesses
Inventors
Milton F. Beecher.
Macdonald C. Booze.
Attorney.

Patented Mar. 13, 1923.

1,448,684

UNITED STATES PATENT OFFICE.

MILTON F. BEECHER AND MACDONALD C. BOOZE, OF WORCESTER, MASSACHUSETTS, ASSIGNORS TO NORTON COMPANY, OF WORCESTER, MASSACHUSETTS, A CORPORATION OF MASSACHUSETTS.

LAMINATED SUPERREFRACTORY ARTICLE.

Application filed April 8, 1921. Serial No. 459,738.

*To all whom it may concern:*

Be it known that we, MILTON F. BEECHER and MACDONALD C. BOOZE, citizens of the United States of America, residing at Worcester, in the county of Worcester and State of Massachusetts, have invented certain new and useful Improvements in Laminated Superrefractory Articles, of which the following is a full, clear, and exact specification.

Our invention relates to the composition of a super-refractory article, and specifically of one having a laminated structure.

It is readily apparent that refractory articles which are subjected to various chemical and physical reactions at high temperatures will withstand such conditions if the parts exposed to them are protected or are themselves sufficiently resistant. This resistance has been effected in several ways, such as by covering the refractory structure with a coating of refractory cement which is hardened and forms a protective layer over the surfaces treated, or by making the entire structure of sufficiently refractory material. An intermediate course has also been proposed by which the fire brick or other refractory shapes are composed of a refractory material on one side which decreases in amount toward the interior and opposite side, being progressively replaced by fire clay.

Coatings of refractory cement over fire brick structures are of necessity subjected to more severe heat treatment than the fire brick and tend to spall and crack off when in use. It is, moreover, expensive to manufacture the entire refractory from magnesia, and therefore inadvisable unless made necessary by other considerations. Furthermore, the proposed method of making laminated bricks is not applicable with materials which react to form non-refractory products. For example, magnesia, in either the amorphous or crystalline form, is extremely resistant to high temperatures under basic conditions but it cannot be satisfactorily employed in contact with acid materials such as fire clay, for at elevated temperatures it will flux with the fire clay forming an easily fused silicate. It cannot therefore be used as a cement or as a surface coating in contact with such materials when very high temperatures are to be employed.

It is accordingly an object of our invention to provide a laminated article having a facing of super-refractory material with a suitable and less expensive support, in which any ingredient capable of reacting with the facing material detrimentally is separated therefrom by a neutral intermediate layer.

It is a further object of our invention to provide a laminated refractory article in which the composition of each layer is such that any reaction between it and an adjacent layer will form a refractory product and in which the layers will cohere to form an integral structure.

Another object of this invention is to provide a refractory article which has a magnesia facing with a refractory fire clay backing, which will withstand extremely high temperatures and will not warp or crack to any serious extent.

Other objects of our invention will be readily apparent in the following disclosure and claims.

In accordance with our invention, we provide such an article with a facing layer composed of a super-refractory material, united by a bond capable of resisting high temperatures. For example, one may employ preshrunk magnesia as the refractory and bond it with finely divided magnesia or zirconia. To provide a support for the facing, we may utilize any material having sufficient strength, such as fire clay. If the support contains an ingredient which reacts detrimentally with the facing material, it may be separated therefrom by an intermediate layer, integrally united with both the facing and the backing, which is made up of ingredients neutral to those of the facing layer. This inner layer, herein termed neutral, may be composed of materials less refractory than the facing, but they should react with the ingredients of the facing only to form a refractory product, if at all. For this purpose, refractory substances such as alumina or preferably crystalline alumina may be used and bonded with any suitable material, but if less refractory than the main constituents, they should be used in relatively small amount. For this bond, we may use an aluminous or vitrifiable clay, preferably low in free silica, such as one of the ball clay type. In the case of magnesia and alumina being used, any reaction between them will result in the formation of a refractory spinel, and make a more intimate union between the layers.

It may be preferable that the magnesia and alumina layers comprise the entire refractory article and if so it may be fired and put into service in this form, and backed up by the fire bricks of the furnace or other construction to which it may be applied. It is, however, ordinarily to be preferred that the backing be provided with a layer of a less expensive material and of similar composition to that of the remainder of the construction in which it is to be employed, which is most commonly fire brick. In such cases, therefore, a third layer is intimately joined to the second or intermediate layer already mentioned, while still in the green or unfired condition. This third layer is composed of materials which will unite but not seriously react with the ingredients of the second layer and which will be relatively inexpensive, such as fire clay or fire clay grog bonded with fire clay.

In the manufacture of such a refractory article it is necessary that, beside consideration of the physical and chemical properties of the constituents, and their relationship, proper attention should be given to the relative coefficients of expansion and shrinkage of each layer during the drying and firing, and when in subsequent use. These factors should be previously determined, and the composition of each layer adjusted so that the resultant effect upon the laminated structure of physical and chemical changes will not disrupt the layers or the joints between them. This may be done by testing such mixtures individually, and proportioning the relative amounts of refractory and bonding materials in each, so that the mixtures to be used will expand and contract alike when joined together into a laminated structure and subjected to the various conditions of drying, firing and using the finished article.

Reference being had to the drawing, we have there illustrated in cross sectional view a three layer laminated refractory fire brick comprising a facing 1 of super-refractory material, an intermediate layer 2 and a fire clay backing 3. As a specific example of the compositions which may be used for making this type of brick, the following have been successfully employed:

Facing.

65% prefused magnesia, 14 mesh and finer.
20% magnesia ground in the ball mill for 24 hours.
15% zirconia ground with water for 72 hours.

Intermediate layer.

42½% crystalline alumina, size 14 mesh.
25% crystalline alumina, size 46 mesh.
17½% crystalline alumina, size 90 mesh and finer.
15% Mississippi ball clay.

Backing.

35% burnt fire clay grog, 10 to 16 mesh.
35% burnt fire clay grog, 16 mesh and finer.
20% Mississippi ball clay.
10% kaolin.

Water is added to each mixture until sufficient plasticity is obtained for convenient molding.

In the manufacture of a standard fire brick of this composition, we prepare a plastic mixture of electrically fused or preshrunk magnesia, finely ground magnesia and zirconia, and water. A layer of this mixture is placed in the ordinary brick mold to the desired thickness, the free surface being left rough and moist. A second mixture is then prepared, of granular crystalline alumina, the clay bond and water, which is spread over the first layer in the mold and forced against it sufficiently to make the two layers cohere intimately. If, as mentioned above, the layers of magnesia and alumina should be thick, the mold may be filled with them and the brick thus molded carried through the drying and firing operations from this point. Otherwise, a third layer is applied upon the second, composed of crushed fire clay grog, fire clay and water, with which the mold is filled. The free surface of the brick is then finished in the usual manner and the brick may be pressed, if this is desired. The brick thus formed is then removed from the mold, allowed to dry thoroughly and fired according to the usual ceramic practice to a sufficient temperature to set the bonds used and to harden the whole into a firm unitary structure throughout. The product thus obtained may be used and set up in the same fashion as the ordinary fire brick.

Fire bricks or other refractory articles made in accordance with this general method of procedure and of suitable refractory compositions may be employed for numerous purposes. They will withstand exceedingly high temperatures, and resist the chemical action of slags and other destructive materials such as vapors, dust and so forth, equally as well as those refractories made entirely of the super-refractory material itself. In some cases they have the advantage of much greater strength than is obtainable with the bonded super-refractory. When adjacent layers contain materials which react, such reaction serves to strengthen the union between them, and since the product formed is also refractory, no deterioration of the article, either locally or as a whole, results. Furthermore, reaction between the backing and facing layers is effectually prevented so that even when strongly reactive substances are used in the same refractory article, there is no danger of fluxing. A considerable economy is also effected by making articles in accordance with my invention, for all super-refractory materials are more expensive than those of lower melting points which may thus be employed.

It is to be noted that while finely ground zirconia, as well as finely ground magnesia, was employed as the bonding agent in the example given, either one of these materials alone may be used as the bond with satisfactory results. It will also be apparent that various other changes may be made in the combinations and compositions referred to without departing from the scope of our invention, and also that numerous modifications and adaptations may be made in the application of it to particular conditions, but such changes and adaptations are to be considered as included by this specification and the following claims.

Having thus described our invention, what we claim as new and desire to secure by Letters Patent is:

1. A laminated refractory article having a facing of bonded refractory material, a reinforcing backing layer of ceramic material which is reactive with an ingredient of the facing, and a neutral intermediate layer intimately joined to and separating the facing and backing layers.

2. A laminated refractory article having a super-refractory facing comprising magnesia, a refractory ceramic backing support therefor, and an intermediate layer composed of such material that any reaction between it and the ingredients of the facing shall form a refractory product.

3. A laminated refractory article having a facing containing highly refractory material, which may flux with fire clay, a backing layer of fire clay, and an intermediate neutral refractory layer intimately joined to said facing and backing.

4. A laminated refractory article having a facing, containing preshrunk magnesia grains united by a bond, which is intimately joined with a reinforcing backing, comprising a layer adjacent said facing composed substantially of refractory material which is neutral toward magnesia.

5. A laminated refractory article having a super-refractory facing containing magnesia which is intimately united with a reinforcing backing, comprising a layer containing alumina adjacent said facing.

6. A laminated refractory article having a facing of bonded preshrunk magnesia which is intimately united with a backing comprising a layer of ceramic bonded crystalline alumina adjacent said facing.

7. A laminated refractory article comprising a plurality of layers intimately united together, the facing consisting of bonded preshrunk magnesia granules and the backing containing burned fire clay.

8. A laminated refractory article having a facing containing magnesia, a backing layer composed substantially of fire clay, and an intermediate layer which is relatively neutral to and intimately joined with each of said facing and backing layers.

9. A laminated refractory article having a facing of bonded magnesia, a backing layer containing fire clay, and an intermediate layer composed substantially of alumina, intimately joined to each of said facing and backing layers.

10. A laminated refractory article having a facing of bonded crystallized magnesia, a backing layer of fire clay, and an intermediate layer of ceramic bonded crystalline alumina intimately joined to said facing and backing.

11. In a laminated refractory article, a facing of preshrunk magnesia and a bond therefor containing finely divided magnesia, said facing being intimately joined to a backing comprising a layer of material which may react with magnesia to form a refractory compound.

12. A laminated refractory article in which the surface layer contains crystalline magnesia bonded with finely divided magnesia intimately joined to a backing, comprising a layer of bonded crystalline alumina adjacent said surface layer, and a layer consisting substantially of fire clay.

13. A laminated refractory article having a facing of bonded crystalline magnesia and zirconia, and a reinforcing neutral backing intimately joined thereto.

14. A laminated refractory article having a facing of bonded magnesia and zirconia, intimately joined to a reinforcing backing, comprising a layer containing alumina which is adjacent said surface layer.

15. A laminated refractory article having a facing containing bonded preshrunk magnesia, finely divided magnesia and zirconia, intimately joined to a layer of crystalline alumina, and a vitrified ceramic bond therefor, and a backing united with said layer composed substantially of fire clay and fire clay grog.

16. A laminated refractory article comprising a facing layer, the major portion of which is magnesia, a ceramic backing layer substantially free from magnesia, and an intermediate body joining said layers consisting of ingredients which are neutral toward but unite integrally with the backing, and are capable of uniting with the magnesia to form a super-refractory product.

Signed at Worcester, Massachusetts, this 7th day of April 1921.

MILTON F. BEECHER.
MACDONALD C. BOOZE.